Patented Oct. 30, 1951

2,573,358

UNITED STATES PATENT OFFICE 2,573,358

PROCESS OF OXIDIZING FATTY MATERIALS

Herbert Otto Renner, Des Plaines, Ill., assignor, by mesne assignments, to J. R. Short Milling Company, Chicago, Ill., a corporation of Illinois No Drawing. Application March 18, 1946, Serial No. 655,374

9 Claims. (Cl. 195—51)

This invention relates to new oxidation products of fatty materials and processes of preparing the same. More particularly, the invention relates to oxidation products of fatty materials and their preparation in the presence of material containing enzymes whereby oxidation of fatty materials is effected with a qualitative control of reaction products. Even more particularly, the invention relates to an agent serving as a highly efficient bleaching agent for bleaching such material as dough from unbleached or partially bleached flour.

In the process of the present invention, oxidation of fatty materials is accomplished by treating oxidizable fatty materials with gas containing free oxygen in the presence of material containing certain enzymes which effect the catalytic oxidation of such compositions without generating undesirable organoleptic by-products which otherwise would occur due to the presence of oxidizable minor constituents in the fatty materials. The specific fatty material used in the process of this invention is peanut oil having certain characteristics. The products, when used in the treatment of dough, improve the appearance of the dough and the resultant bread without adversely affecting the odor and taste of the bread.

This invention renders unnecessary resort to such auxiliary process as: refining the organic oxidation product by means of plasmolyzed yeast, in order to remove objectionable odors and flavors, or pre-treating the organic compound to be oxidized with halogens, in order to modify, before enzymic oxidation, those above mentioned oxidizable minor constituents in such a way as to decrease or eliminate their affinity for oxygen, and thus prevent the formation of undesirable organoleptic by-products.

The peanut oil products prepared by this process serve as highly efficient bleaching agents for bleaching such materials as dough from unbleached or partially bleached flours.

Whole freshly ground peanuts, solvent extracted peanuts, or peanut press cake have been found to be a convenient and most effective catalyst in the enzyme peroxidation of organic substances, according to this invention. It should be noted that these peanut materials are not ordinary commercial forms, but specially prepared so as to retain their enzyme value and therefore be enzyme-active within the meaning of this specification. It has now been found that the peanut possesses superior properties over all other materials heretofore employed, not only as a source of the oil to be oxidized, but also as the source of the oxidizing enzymes. Most surprising and unexpected results are obtained when peanut oil is oxidized with enzymes derived from the same source (peanuts), in that the resulting product is markedly superior to any other combination of ingredients heretofore tested as to stability, odor and flavor, as will be more specifically disclosed hereinafter.

For brevity and clarity, the following special terminology will be used in this specification, with the meanings indicated.

In the description of the present process the terms "oil," "fat," "fatty materials," and "fatty acid compositions" may be used interchangeably, and any one of these materials may be substituted for any other.

The degree of peroxidation of the peanut oil may be expressed in terms of molecules (M) of hydrogen peroxide per 1000 grams of peanut oil, or in grams of hydrogen peroxide per 100 grams of peanut oil. The so-called M-values given in this specification are in the first mentioned terms.

The peanut materials containing enzymes are hereinafter designated as enzymic materials or sources. The fat-peroxidizing action of an enzymic complex will be abbreviated as its "FP" action.

Enzyme-oxidation of fats, under optimal conditions of pH and temperature, has been proven to be the most powerful means of peroxidizing fats such as peanut, cottonseed or soybean oil. In view of the complex compositions of such fats, and the presence of a great deal of oxidizable matter in them, enzyme-peroxidation is always accompanied by more or less undesirable oxidation of minor constituents of said fats and/or of the enzyme-sources employed; this in turn results in the formation of odoriferous and objectionable oxidation by-products. The latter, apparently absorbed by the fats during peroxidation, impart to said fats certain obnoxious odors and flavors, the removal or modification of which forms the subject matter of United States Patents No. 2,316,621, No. 2,349,377, and No. 2,349,378.

While the refining methods set forth in these patents constituted valuable means of improving both the odor and flavor of the peroxidized organic compounds, as well as the odor and flavor of food products containing such compounds, such methods constituted additional expensive and time consuming operations which can be completely eliminated by the simplified process herein disclosed and a superior result obtained. In the work leading to the present process the whole problem was approached from a new angle with the result that a new method of producing enzyme-peroxidized peanut oil, having greatly improved properties in comparison with the former products, were developed.

The path which led to the present invention was first indicated by certain peculiar phenomena observed in the course of researches on enzyme oxidation of fats. Thus, it was found that organoleptic rancidity invariably sets in during exposure of a fat to molecular oxygen (of the atmosphere) as soon as peroxide concentrations equivalent to an M-value of 0.010 are reached, whereas no such rancidity occurs when the same fat is enzyme-peroxidized to M-values of 0.080 or higher, under conditions such as those disclosed in United States Patent 1,994,992, issued March 19, 1935. This unexpected result clearly shows that peroxidized fats produced by the latter method differ qualitatively from those formed during natural oxidation with accompanying organoleptic rancidity. It further shows the error of attempting to measure the rancidity of a fat solely by its peroxide-content. The literature fails to show any attempts to establish relationships between oxidative rancidity and the qualitative properties of the peroxides formed. Special methods which developed in the course of study of this subject have thrown much light upon the qualitative differences of fat peroxides formed during oxidative rancidity as well as by enzyme-peroxidation and these methods served as valuable tools in developing the novel and unforeseen results disclosed in this specification.

In the work leading to this present invention it was found that the FP enzyme complex of one kind of seeds produces in an oil, derived from another kind of seeds, fat peroxides which differ materially from the fat peroxides produced in the oil derived from the same kind of seeds in which the FP enzyme originated.

It was further found that the FP-enzyme complex of one kind of seeds, which was created by nature to meet the specific requirements of germination needed to make the fatty matter contained in said seeds available to the growing germ and plant, by breaking it down to simple chemical units adapted to enter the metabolism of said germ and plant, profoundly differed, quantitatively and qualitatively, as well as by its mode of action, from the FP-enzyme complex of another kind of seeds. These findings led to the further surprising and unexpected discovery that the FP-enzyme complex (including any other co-factors of the oxidative systems which participate in the fat-peroxidizing reaction) of the seeds of one species appear to be foreign to the oil derived from seeds of another species.

As a concrete example, the peanut is a species of the genus Papilionaceae of the pea family (legumes). The FP-enzyme complex of the peanut is specially created to meet the specific requirements of the growing peanut seeds to make peanut oil assimilable. The fact that germinating oil seeds, such as peanuts, never develop organoleptic rancidity indicates plainly that the breakdown of the oils into assimilable metabolic building stones is accomplished by their own FP-enzyme systems without the formation of undesirable and organoleptically offensive by-products.

In contrast thereto, the methods of preparing enzyme-peroxidized fats, as heretofore practiced, represent a flagrant departure from the natural system wherein the germinating oil seeds containing FP-enzyme systems are derived from the same source. Thus, when the FP-enzyme complex of the soy-bean acts upon the oil of the peanut (a species foreign to the soy-bean) the peanut oil constituents are attacked chemically in a manner fundamentally different from the attack of the same peanut enzyme complex upon peanut oil. Consequently, odoriferous substances, and more or less unstable intermediate oxidation products, are formed which have been the cause of previous difficulties, the removal, modification and non-formation of which have been the subject matter of the above-mentioned United States patents.

The following experimental data substantiates the correctness of the foregoing statements:

*Table I*

| Item No. | Concentration of Soy-Extract | Increase in M-value produced under identical conditions in: | | | |
| --- | --- | --- | --- | --- | --- |
| | | Refined Cottonseed Salad Oil, Wesson Brand | Other Commercial Brands | Peanut Oil | |
| | | | | Refined in U. S. from U. S. Grown Peanuts | Refined in England from African Grown Peanuts |
| 1 | 1 g. Soy-flour: 100 cc. 0.1% CaCl$_2$ Sol. in H$_2$O | 0.046 | 0.035 | 0.028 | 0.026 |
| 2 | 1 g. Soy-flour: 8 cc. 0.1% CaCl$_2$ Sol. in H$_2$O | 0.123 | | 0.080 | 0.068 |

*Table II*

[Ratio of oil to enzyme-extract in all cases=100 grams:100 cc. Concentration of enzyme-extract—1.5 grams per 100 cc. CaCl$_2$ Sol.]

| Item No. | Source of FP-enzyme complex | Increase of M-value produced within 30 minutes in U. S. Refined Peanut Oil (=serving as control or standard as to odor, flavor and color). |
| --- | --- | --- |
| 1 | Soy-flour, whole | M=0.059. Typical offensive odor during reaction; oil is brownish discolored, has unpleasant fatty flavor. |
| 2 | Peanuts, whole, freshly ground. | M=0.016. Entirely bland O/F of mix during reaction; same oil as control as to O/F and, color. |
| 3 | Solvent-extracted Peanuts. | M=0.030-0.032. Pleasant nutty O/F during reaction; isolated oil pleasant O/F. |
| 4 | Peanut Press-cake, 33% oil removed. | M=0.021. Pleasant, slightly nutty, very bland O/F color (light yellow) superior to control (brownish). |

O/F = odor and flavor.

Table I demonstrates the marked influence of oils or fats, not originating in the species of seeds (soy-bean) from which the FP-enzyme complex is derived, upon the degree of peroxidation produced under strictly identical conditions.

The data of Table II, more specifically demonstrate the disadvantages of processing peanut oil with the FP-enzyme complex of the soy-bean, and the unexpected advantages of peroxidizing said oil with the enzyme-complex of peanuts, the same species of seeds from which the oil has been derived. In all of the latter cases (items 2, 3 and 4), there was a complete absence of any unpleasant odors and flavors never before observed during the fat-peroxidizing reaction; the isolated peroxidized oils showing in all cases a blandness of odor, a desirable nuttiness of flavor and stability of color which made distinction from the original nonperoxidized peanut oils difficult, if not impossible. These improvements are most significant in view of the fact that pre-halogenation, as well as plasmolyzed yeast refining, of peroxidized oil can be omitted without impairing the quality of the product.

In principle, from the mechanical point of view, any of the methods of producing enzyme-peroxidized products disclosed in the prior art cited (U. S. Patents 1,994,992; 2,198,015; 2,349,377) could serve as examples for the above described new methods if the soy-flour employed is replaced by peanut meal containing a FP-enzyme complex, and peanut oil to be peroxidized is replaced by the oil. Moreover, the novel principles and methods herein disclosed permit, in commercial practice, unexpected simplifications and economies in the process which emphasize the patentability of the above disclosures over the prior art.

The following example serves to illustrate the application to commercial practice of the new principles disclosed above.

After the peanut oil to be processed has been selected and the enzyme activity of the material to be used as enzyme source has been determined by laboratory methods closely paralleling commercial practice and having yielded results, as indicated in Table II, a dilute enzyme-extract is prepared by suspending, and keeping suspended by thorough but non-aerating agitation, 45 parts (4.5%) by weight of shelled, whole Spanish peanuts, finely ground, or 23.2 (2.32%) parts by weight of the solvent extracted peanut meal, or 34 (3.4%) parts by weight of a comminuted peanut meal press cake in 1000 parts of cold tap water (which does not require any adjustment of its pH if the latter is found above 7.0) in which 0.1% of anhydrous calcium chloride is dissolved.

After about one-half hour of agitation the suspension is permitted to settle for about an hour, after which 800 parts by weight or volume of the supernatant enzyme extract can be easily syphoned off from the top into a reaction tank provided with suitable means of optimal agitation as well as aeration and containing about 800 parts by weight of edible peanut oil. The agitation plus aeration accomplished by agitators of the Turbo mixer type, at a reaction temperature starting around 12° C. (53.6° F.) and allowed to gradually climb to about 26° C. (78.8° F.), will produce the desired M-value of 0.047 within an approximate reaction period of 30 minutes. No addition of enzyme-concentrates to give the peroxidizing process new impetus is required.

The reaction mix, without further processing, after speedy (indirect bottom) heating to a temperature of about 43-45° C. (109.4-113° F.) is allowed to rest sufficiently long to permit the formation of an aqueous layer which is drained off whereby valuable time required for (super) centrifuging of the mix is saved. The clear processed oil leaving the centrifuge has entirely bland odor and flavor, in no way inferior, and generally superior, to the oil from which the peroxidized oil had been prepared. It is preferably compounded with hydrogenated (hardened) peanut oil to produce a solid shortening compound having marked dough-bleaching properties.

The most striking advantages of this simplified processing over the methods disclosed by the prior art are: (1) No pre-treatment of the oil is needed. (2) No subsequent refining of the processed oil by means of plasmolyzed yeast is required to remove undesirable odor or flavor, thus decreasing the storage requirements of the plant and saving power, labor, material and time. (3) The solid residue from the preparation of enzyme extracts is usable, as well as any protein solids removed from the reaction mix by centrifuging, both by-products remaining appetizing (as cattle feed) with regard to odor and flavor, in contrast to the offensive odors and flavors of the solid residues resulting from the prior art. (4) If alkaline water, with pH above 7.0 is used, no pH adjustments are required, the reaction being carried through without the pH of the reaction mix and the oil phase ever dropping below 7.0, which means additional savings in material, time and labor required by the prior art methods for such adjustments.

It is understood that numerous variations in the above method as to ratio of enzyme-extract to oil phase, concentration of enzyme extract, reaction temperature and time, and M-value desired, may be practiced without departing from the fundamental principles of this invention.

In line with the well known observation that the stability of a refined edible oil decreases with an increase in the number of refining operations to which said oil has been subjected, it has also been found that the use for the process of this invention of crude peanut oil, prepared either by low temperature solvent, such as petroleum naphtha solvents commonly employed in industry extraction, or cold pressing of ground whole peanuts, offers marked advantages over the use of commercially refined oils. The enzyme-peroxidation seems to progress more speedily in such crude peanut oil, due to the fact that non-enzymic co-factors of the FP-enzyme complex contained in the crude oils are destroyed or modified during alkali-refining and high-temperature de-odorization, bleaching, practiced by the vegetable oil industry. However, the most important advantage of crude oil over refined oil is the fact that the omission of the refining process permits the retention of the desirable odor and flavor constituents of the enzyme source which impart to the finished peroxidized oil, and particularly to the finished food products processed therewith, said desirable odor and flavor characteristics. Such results are never obtained when commercially refined oil, peroxidized by the prior art methods, is used in food processing. The following advantages of using crude peanut oil as defined above, for making peroxidized bread shortenings are immediately apparent: (1) the best bread products, from the standpoint of desirable odor and flavor, are obtained; (2) costly oil refining methods, heretofore employed by the trade, become superfluous; (3) mere cold pressing (without any application of heat) of freshly ground whole peanuts produces directly the peanut oil required for peroxidation; while the press cake residue, besides furnishing all the enzymic raw material required, constitutes a valuable by-product as feed for cattle, with the original pleasant odor and flavor of the whole peanut fully preserved, in contrast to the relatively odoriferous and unpalatable press cake obtained by customary expellor and hydraulic pressing at high temperature.

Table III shows the comparative enzymic strengths of various peanut raw materials by indicating the relative concentrations of these enzymic sources which have to be employed to produce in peanut oil the same desired M-value of 0.047 within a specified time (30 minutes) under identical controlled condition of temperature and viscosity of reaction mixtures.

*Table III*

[Ratio of Oil:enzyme-extract in all cases—100 grams:100 cc.]

| Item No. | Source of FP-enzyme complex | Concentration of Enzyme-extract | Increase of M-value produced within 30 minutes in: U. S.: refined Peanut Oil |
|---|---|---|---|
| 1 | Peanuts, Spanish, whole, freshly ground. | 4.3 grams, 100 cc. $CaCl_2$ Sol | M=0.047. Pleasant nutty O/F during reaction; Oil odor/flavor pleasant, color as blank. |
| 2 | Solvent-extracted peanuts. | 2.32 grams, 100 cc. $CaCl_2$ Sol | M=0.047. Slightly nutty O/F during reaction; isolated oil, very bland; O., sl. nutty; F., normal original color of blank. |
| 3 | Peanut Press Cake, 33% oil removed. | 3.4 grams, 100 cc. $CaCl_2$ Sol | M=0.047. Pleasant bland, sl. nutty O/F; isolated bland as original. |

O/F=odor and flavor.

The results obtained by the method disclosed in the foregoing support the hypothesis advanced herein that specific constituents of the seeds from which the FP-enzyme complex has been derived, per se, or modified by oxidation and other chemical reactions accompanying enzyme peroxidation of oils, contribute more to the odor and flavor of the oxidized product, and food stuffs prepared therewith, than has been heretofore realized.

The invention has been disclosed herein for illustrative purposes in its preferred embodiment, but it is to be understood that the scope of the invention is defined by the appended claims rather than by the foregoing description.

What I claim is:

1. A process of preparing organic oxidation products characterized by reacting peanut oil with a gas containing free oxygen in the presence of enzymic extract previously prepared from the same raw material as said oil, whereby the chemical stability of the product is increased and undesirable organoleptic by-products are substantially eliminated.

2. A process of preparing oxidation products of fatty materials characterized by reacting crude peanut oil with a gas containing free oxygen in the presence of previously prepared extract of enzymic material derived from whole, freshly ground peanuts.

3. A process of preparing oxidation products of fatty materials characterized by reacting crude peanut oil with a gas containing free oxygen in the presence of previously prepared extract of enzymic material obtained from cold pressed peanut press cake.

4. A process of preparing oxidation products of fatty materials characterized by reacting peanut oil with a gas containing free oxygen in the presence of catalytic enzymic extract previously prepared from peanuts by extracting whole freshly ground peanuts with cold water of pH above 7, in which approximately 0.1 percent of anhydrous calcium chloride is dissolved.

5. A process of preparing peroxidized peanut oil characterized by reacting crude peanut oil with a gas containing free oxygen in the presence of a catalytic enzymic extract previously prepared by extracting approximately 45 parts by weight of shelled, whole peanuts, finely ground, with 1000 parts of cold water of pH above 7.0, in which approximately 0.1 percent of anhydrous calcium chloride is dissolved.

6. A process according to claim 5 in which the extract is prepared by extracting approximately 23 parts by weight of solvent extracted peanut meal with 1000 parts of water.

7. A process according to claim 5 in which the extract is prepared by extracting approximately 34 parts by weight of comminuted peanut meal press cake with 1000 parts of water.

8. A process of preparing enzyme peroxidized peanut oil, which process comprises treating crude peanut oil with gas containing free oxygen in the presence of previously prepared extract of enzymic material containing enzymes which effect the peroxidation of the peanut oil, the material from which said enzymic material is prepared being selected from a group consisting of whole, freshly ground peanuts, cold solvent extracted peanuts, and cold pressed peanut cake as a source of the enzymic complex.

9. A process of preparing enzyme peroxidized peanut oil characterized by reacting peroxidizable peanut oil simultaneously with fat peroxidizing enzymes originating in peanuts and a gas containing free oxygen, whereby the peanut oil is peroxidized and the chemical stability of the peanut oil thus peroxidized is increased and undesirable reaction products are substantially eliminated.

HERBERT OTTO RENNER.

REFERENCES CITED

The following references are of record in the file of this patent:

UNITED STATES PATENTS

| Number | Name | Date |
|---|---|---|
| 1,994,992 | Hass et al. | Mar. 19, 1935 |
| 2,316,621 | Renner | Apr. 13, 1943 |
| 2,349,377 | Renner | May 23, 1944 |